Patented Apr. 30, 1929.

1,711,390

UNITED STATES PATENT OFFICE.

OSKAR KNECHT, OF BINNINGEN, NEAR BASEL, SWITZERLAND, ASSIGNOR TO CHEMICAL WORKS FORMERLY SANDOZ, OF BASEL, SWITZERLAND.

MANUFACTURE OF AZODYESTUFFS FOR DYEING CELLULOSE ESTERS.

No Drawing. Application filed December 23, 1925, Serial No. 77,380, and in Germany January 6, 1925.

Dyestuffs suitable for dyeing cellulose esters, which are too difficultly soluble for practical application, have been employed, up to now, either in the form of their bisulphite compound as stated in the specifications of British Patent No. 204,280 (1923) or as N-alkyl-ω- sulphonic acids, according to the specifications of British Patent No. 197,809 (1923), No. 200,873 (1923) and No. 212,029 (1924). During the dyeing process the acid groups of these dyestuffs are split off by hydrolysis, under the influence of the elevated temperature of the dye bath and the colors thus formed are then absorbed by the cellulose ester fibres.

It has now been found that it is possible to transform insoluble or difficultly soluble azodyestuffs containing neither sulphonic nor carboxylic groups and possessing a particular affinity for cellulose esters, into stable and soluble derivatives by introducing a radical of glycol into the molecule of the dyestuffs in place of one or more hydrogen atoms of the aromatic nucleus. This can be performed by coupling diazoarylglycolethers which possess neither sulphonic nor carboxylic groups, but which may possess any other substituents, with azo components containing neither carboxylic nor sulphonic groups.

The dyestuffs thus obtained, apart from their good solubility, are distinguished by a particular affinity for cellulose esters, so that by their aid, bright and uniform shades may be obtained, without having to employ temperatures, which would be injurious to the fibres. In those cases, where the dyestuffs contain diazotizable aminogroups, the direct shades may be diazotized on the fibre and coupled with suitable developers.

The dyestuffs obtained by the process as described above are entirely different from those referred to in the above mentioned patents the dyeing with these last mentioned dyestuffs is only possible by the fact, that their acid groups, to which their solubility in water is due, are split off by hydrolysis during the dyeing process. In contrast to this, the glycol-radicals of the new dyestuffs remain fixed to the dyestuff molecule during the dyeing process and their uniform dyeing and good penetration are rendered possible.

The following example illustrates the improved process.

Example.

19.8 kg. of glycol-2-amino-4-nitrophenylether, obtained by partial reduction of glycol-2.4-dinitrophenylether are dissolved in 100 litres of water and 24 kg. of concentrated hydrochloric acid, then diazotized at 0-5° C. with 6, 9 kg. of sodium nitrite and coupled with 11 kg. of m-toluidine, which have been dissolved in 100 litres of water and 12 kg. of hydrochloric acid. The dyestuff precipitates in greenish brown crystals of bronzy brightness and is then filtered and dried; it forms a dark brown powder. Its hydrochloride dissolves in water, showing a yellow orange colour; this solution dyes cellulose acetate in a yellow shade, which, by diazotizing and developing with β-naphthol is transformed into a brilliant red. The dyestuff possesses most probably the following formula:

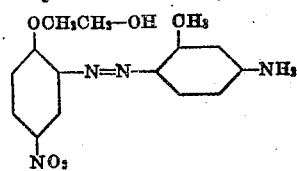

The dyestuff as developed on the fibre with β-naphthol possesses most probably the following formula:

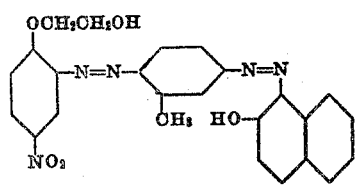

What I claim is:

1. A process for the preparation of azodyestuffs, containing neither carboxylic nor sulphonic groups, suitable for dyeing cellulose esters, consisting in coupling a diazo compound having at least one hydrogen atom of its aromatic nucleus substituted by a radical of glycol, with an azo component.

2. As new products of manufacture, the herein described azodyestuffs for dyeing cellulose esters, obtained in coupling a diazotized aminoarylglycolether free from carboxylic and sulphonic groups with an azo component also free from carboxylic and sulphonic groups, said dyestuffs being in the form of the hydrochloride easily soluble in water and so dissolved dyeing cellulose esters of yellow to orange, red, brown, blue and violet tints, which diazotized and developed are orange, red, brown, blue, violet and black.

In witness whereof I have hereunto signed my name this 10th day of December 1925.

OSKAR KNECHT.